(12) United States Patent
Sun et al.

(10) Patent No.: US 10,698,439 B1
(45) Date of Patent: Jun. 30, 2020

(54) EFFICIENT CLOCK FORWARDING SCHEME

(71) Applicant: QUALCOMM Incorporated, San Diego, CA (US)

(72) Inventors: Li Sun, Irvine, CA (US); Russell Deans, Chapel Hill, NC (US); Zhiqin Chen, San Diego, CA (US); Zhi Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/413,292

(22) Filed: May 15, 2019

Related U.S. Application Data (60) Provisional application No. 62/799,652, filed on Jan. 31, 2019.

(51) Int. Cl.
  *H04L 7/00* (2006.01)
  *G06F 1/08* (2006.01)
  *G06F 1/06* (2006.01)

(52) U.S. Cl.
  CPC .............. *G06F 1/08* (2013.01); *G06F 1/06* (2013.01); *H04L 7/0008* (2013.01)

(58) Field of Classification Search
  CPC ....... H04L 7/0008; H04L 7/0337; G06F 1/08; G06F 1/12; G06F 1/06; G06F 1/04
  See application file for complete search history.

(56) References Cited

U.S. PATENT DOCUMENTS

| | | | | |
|---|---|---|---|---|
| 5,579,353 | A * | 11/1996 | Parmenter | H03L 7/06 375/376 |
| 6,005,904 | A * | 12/1999 | Knapp | H03L 7/06 327/159 |
| 6,127,858 | A * | 10/2000 | Stinson | G06F 1/08 327/276 |
| 6,154,095 | A * | 11/2000 | Shigemori | H03K 3/0307 331/158 |
| 6,687,322 | B1 * | 2/2004 | Zhang | G06F 1/12 375/376 |
| 7,026,878 | B2 * | 4/2006 | Smith | H03L 7/1976 327/156 |
| 7,759,990 | B2 * | 7/2010 | Miike | G06F 1/08 327/147 |
| 8,824,222 | B2 * | 9/2014 | Ware | G06F 1/3275 365/191 |
| 8,860,479 | B2 * | 10/2014 | Huang | G06F 1/10 327/156 |
| 9,847,113 | B2 * | 12/2017 | Choi | G11C 7/222 |
| 2004/0250185 | A1 * | 12/2004 | Date | G01R 31/318536 714/726 |

* cited by examiner

*Primary Examiner* — Thomas J. Hiltunen
(74) *Attorney, Agent, or Firm* — Qualcomm Incorporated (57) ABSTRACT

In certain aspects, an apparatus includes a multiplexer having a first input, a second input, a select input, and an output, wherein the first input is configured to receive a first reference clock signal, the second input is configured to receive a second reference clock signal, and the select input is configured to receive a select signal. The multiplexer is configured to select one of the first and second reference clock signals based on the select signal, and output the selected one of the first and second reference clock signals at the output of the multiplexer. The apparatus also includes a clock driver having an input and an output, wherein the input of the clock driver is coupled to the output of the multiplexer.

22 Claims, 7 Drawing Sheets

EFFICIENT CLOCK FORWARDING SCHEME

RELATED APPLICATION

This application claims priority under 35 U.S.C. § 119(e) to U.S. Provisional Application No. 62/799,652 filed on Jan. 31, 2019, the entire specification of which is incorporated herein by reference.

BACKGROUND

Field

Aspects of the present disclosure relate generally to high-speed communication, and more particularly, to efficient clock forwarding schemes for high-speed communication.

Background

A system may include one or more processing units and peripheral devices such as a wireless modem, a graphics processor, a display, a sensor, etc. The one or more processing units may communicate with the peripheral devices using high-speed communication links according to a standard (i.e., protocol). One popular standard is the peripheral component interconnect express (PCIe) standard, which supports a high-speed serial link capable of transmitting data at multiple gigabits per second.

SUMMARY

The following presents a simplified summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

A first aspect relates to an apparatus. The apparatus includes a multiplexer having a first input, a second input, a select input, and an output, wherein the first input is configured to receive a first reference clock signal, the second input is configured to receive a second reference clock signal, and the select input is configured to receive a select signal. The multiplexer is configured to select one of the first and second reference clock signals based on the select signal, and output the selected one of the first and second reference clock signals at the output of the multiplexer. The apparatus also includes a clock driver having an input and an output, wherein the input of the clock driver is coupled to the output of the multiplexer.

A second aspect relates to a method for clock forwarding. The method includes transmitting a first reference clock signal during data transmission at a first data rate, and, during a data rate change from the first data rate to a second data rate, transmitting a second reference clock signal. The method also includes transmitting the first reference clock signal during data transmission at the second data rate.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
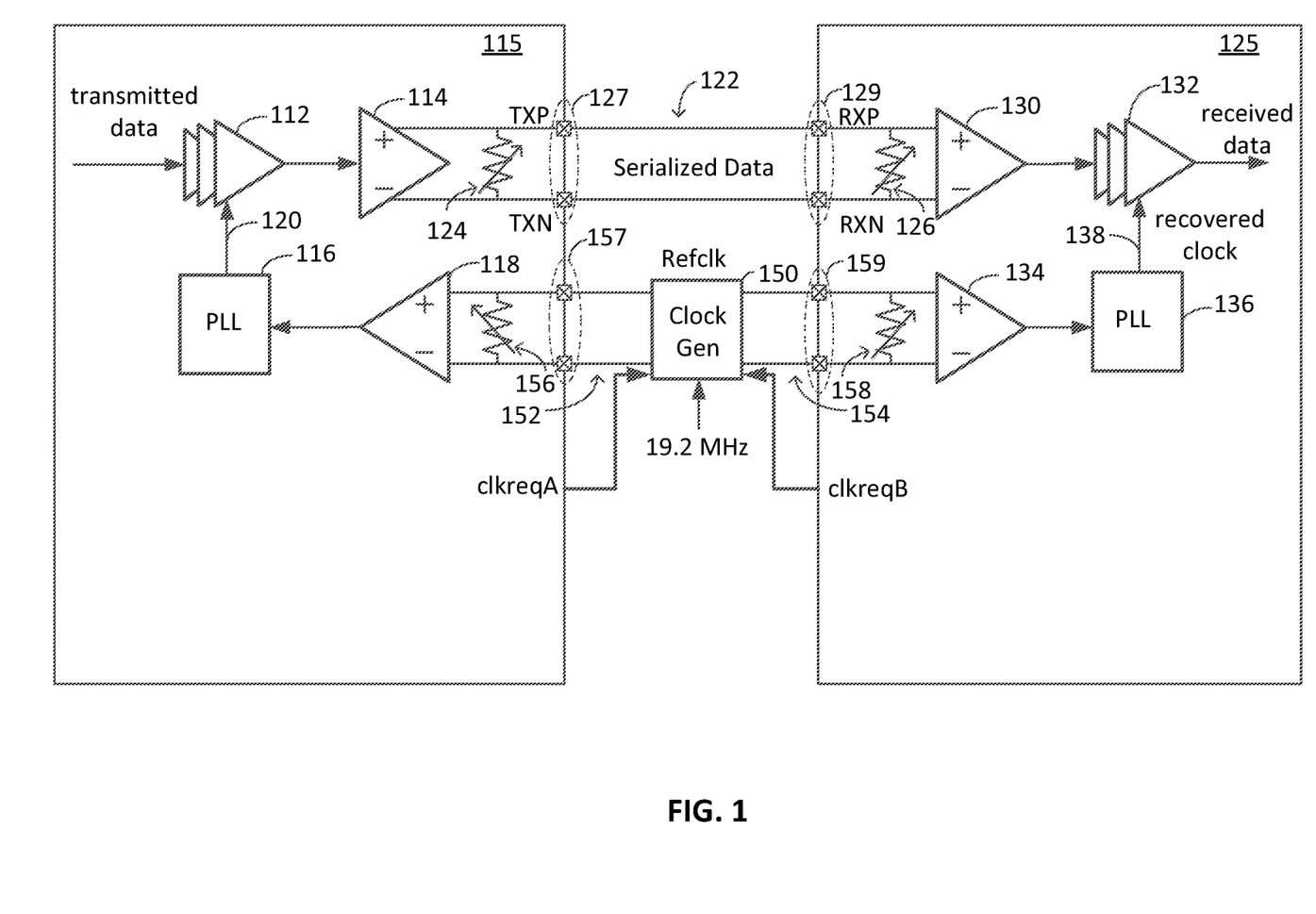
FIG. 1 shows an example of a common reference clock scheme including an external reference clock generator according to certain aspects of the present disclosure.

FIG. 1 shows an example of a common reference clock scheme for high-speed communication between a first chip 115 and a second chip 125. In this example, the first chip 115 may include a root complex that interfaces a processing unit (e.g., CPU) to a peripheral device (e.g., according to the PCIe standard), and the second chip 125 may include the peripheral device or a switch coupled to the peripheral device.

To support high-seed communication between the first and second chips 115 and 125, the first chip 115 includes a data transmitter 112, a link driver 114, a clock receiver 118, and a phase locked loop (PLL) 116. The second chip 125 includes a link receiver 130, a data receiver 132, a clock receiver 134, and a PLL 136.

The link driver 114 on the first chip 115 is coupled to the link receiver 130 on the second chip 125 via a differential serial link 122. The serial link 122 includes two lines (e.g., wires, metal traces, etc.) for transporting a differential serial data signal from the first chip 115 to the second chip 125. The first chip 115 may include an impedance matching network 124 to provide impedance matching between the differential output of the link driver 114 and the serial link 122, and the second chip 125 may include an impedance matching network 126 to provide impedance matching between the differential input of the link receiver 130 and the serial link 122. The first chip 115 may also include input/output (I/O) pads 127 coupled to the differential output of the link driver 114. The I/O pads 127 are used to couple the differential output of the link driver 114 to the differential serial link 122. Similarly, the second chip 125 may also include I/O pads 129 coupled to the differential input of the link receiver 130. The I/O pads 129 are used to couple the differential input of the link receiver 130 to the differential serial link 122. It is to be appreciated that the second chip 125 may include a link driver (not shown) and the first chip 115 may include a link receiver (not shown) coupled to the link driver on the second chip 125 via another serial link (not shown) for communication in the opposite direction (i.e., communication from the second chip 125 to the first chip 115).

FIG. 1 shows a clock generator 150 on a separate chip (i.e., a chip external to the first and second chips 115 and 125). The clock generator 150 is coupled to the clock receiver 118 on the first chip 115 via a first differential clock link 152, and coupled to the clock receiver 134 on the second chip 125 via a second differential clock link 154. The clock generator 150 is configured to generate a differential reference clock signal (labeled "Refclk"), transmit the reference clock signal to the clock receiver 118 on the first chip 115 via the first differential clock link 152, and transmit the reference clock signal to the clock receiver 134 on the second chip 125 via the second differential clock link 154.

In operation, the clock generator 150 receives an input clock signal from a stable clock source (e.g., a crystal oscillator), and converts the input clock signal into the reference clock signal. For example, the clock generator 150 may include a PLL that converts the input clock signal into the reference clock signal by multiplying the frequency of the input clock signal up to the frequency of the reference clock signal. In the example in FIG. 1, the input clock signal may have a frequency of 19.2 MHz, and the reference clock signal may have a frequency of 100 MHz (e.g., according to a PCIe standard). The clock generator 150 may include spread spectrum clock (SSC) control capability to reduce electromagnetic interference (EMI). The clock generator 150 may also generate the reference clock signal in response to receiving a request (labeled "clkreqA") from the first chip 115 or a request (labeled "clkreqB") from the second chip 125.

The clock generator 150 transmits the reference clock signal to the clock receiver 118 on the first chip 115 via the first differential clock link 152. The clock receiver 118 outputs the received reference clock signal to the PLL 116, as discussed further below. The first chip 115 may include an impedance matching network 156 to provide impedance matching between the differential input of the clock receiver 118 and the first differential clock link 152. The first chip 115 may also include I/O pads 157 coupled to the differential input of the clock receiver 118. The I/O pads 157 are used to couple the differential input of the clock receiver 118 to the first differential clock link 152.

The clock generator 150 also transmits the reference clock signal to the clock receiver 134 on the second chip 125 via the second differential clock link 154. The clock receiver 134 outputs the received reference clock signal to the PLL 136, as discussed further below. The second chip 125 may include an impedance matching network 158 to provide impedance matching between the differential input of the clock receiver 134 and the second differential clock link 154. The second chip 125 may also include I/O pads 159 coupled to the differential input of the clock receiver 134. The I/O pads 159 are used to couple the differential input of the clock receiver 134 to the second differential clock link 154.

To transmit data from the first chip 115 to the second chip 125, the PLL 116 on the first chip 115 receives the reference clock signal from the clock receiver 118 and multiples the frequency of the received reference clock signal up to a transmit frequency to generate a transmit clock signal 120. The transmit frequency may be in the GHz frequency range for high-speed data communication. The PLL 116 outputs the transmit clock signal 120 at the transmit frequency to the data transmitter 112. The data transmitter 112 receives data to be transmitted, and converts the data into a serial data signal synchronized with the received transmit clock signal. The data to be transmitted may come from a root complex (not shown) on the first chip 115, in which the root complex provides an interface for a processing unit (e.g., CPU) to one or more peripheral devices according to the PCIe standard or another standard. The data transmitter 112 may be implemented, for example, with a serializer that is clocked using the transmit clock signal 120. The data transmitter 112 outputs the serial data signal to the link driver 114, which transmits the serial data signal to the link receiver 130 on the second chip 125 via the differential serial link 122. The link driver 114 transmits the serial data signal by driving the differential serial link 122 with the serial data signal.

On the receiver side, the PLL 136 on the second chip 125 receives the reference clock signal from the clock receiver 134 and multiples the frequency of the received reference clock signal up to a receive frequency to generate a receive clock signal 138. The receive frequency may be equal to the transmit frequency at the first chip 115. The PLL 136 outputs the receive clock signal 138 (also referred to as the recovered clock) at the receive frequency to the data receiver 132. The data receiver 132 receives the serial data signal from the link receiver 130, and recovers the data from the received serial data signal using the receive clock signal 138. For example, the data receiver 132 may recover the data by sampling the serial data signal using the receive clock signal 138. The data receiver 132 may output the recovered data to another device (not shown) on the second chip 125 for further processing. The other device may include a peripheral device (e.g., a wireless modem, a graphics processor, a display, a sensor, etc.).

A drawback of the common reference clock scheme in FIG. 1 is that the scheme requires an external chip for the clock generator 150, which increases the cost of the system. In addition, overall system power is higher because of the external chip.

Figure 2:
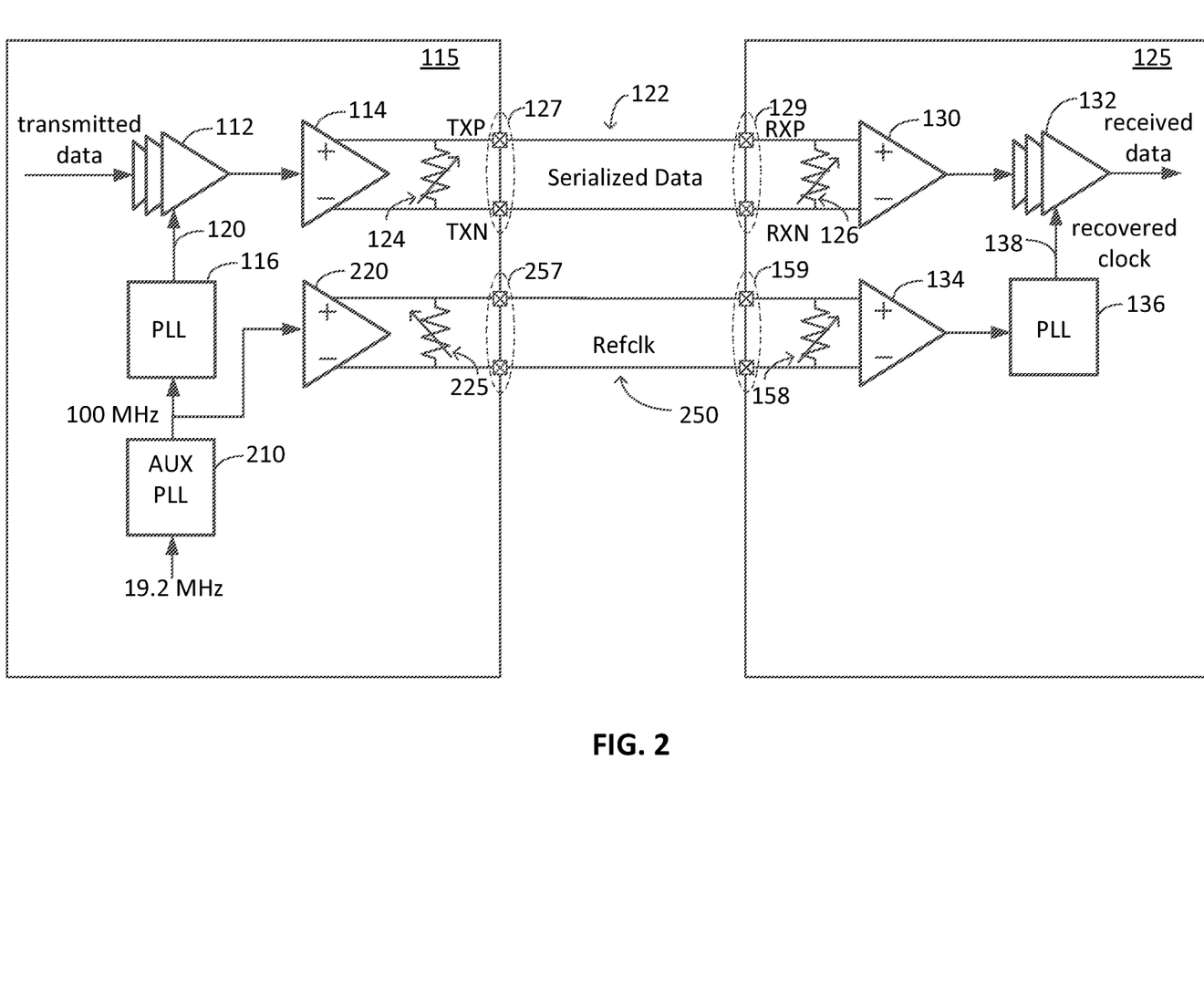
FIG. 2 shows an example of a clock forwarding scheme including a phase locked loop (PLL) for generating a reference clock signal according to certain aspects of the present disclosure.

FIG. 2 shows an example of a clock forwarding scheme for high-speed communication between the first chip 115 and the second chip 125. Components that are common to the clock scheme in FIG. 1 and the clock scheme in FIG. 2 are identified by the same reference numbers. The clock scheme in FIG. 2 differs from the clock scheme in FIG. 1 in that the clock scheme in FIG. 2 uses an auxiliary clock PLL 210 on the first chip 115 to generate the reference clock signal instead of a clock generator on an external chip. The clock PLL 210 receives the input clock signal (e.g., 19.2 MHz clock signal) discussed above and multiplies the frequency of the input clock signal up to the frequency of the reference clock signal to generate the reference clock signal. As discussed above, the input clock signal may have a frequency of 19.2 MHz and the reference clock signal may have a frequency of 100 MHz. The clock PLL 210 outputs the reference clock signal to the PLL 116. The PLL 116 converts the reference clock signal into the transmit clock signal 120 and outputs the transmit clock signal 120 to the data transmitter 112, the same as before.

In this example, the first chip 115 also includes a clock driver 220 coupled to the clock receiver 134 on the second chip 125 via a differential clock link 250. The first chip 115 may also include an impedance matching network 225 to provide impedance matching between the differential output of the clock driver 220 and the differential clock link 250. The first chip 115 may also include I/O pads 257 coupled to the differential output of the clock driver 220. The I/O pads 257 are used to couple the differential output of the clock driver 220 to the differential clock link 250.

In operation, the clock PLL 210 also outputs the reference clock signal to the input of the clock driver 220. The clock driver 220 transmits (i.e., forwards) the reference clock signal to the clock receiver 134 on the second chip 125 via the differential clock link 250. The clock receiver 134 on the second chip 125 receives the reference clock signal, and outputs the received reference clock signal to the PLL 136. The PLL 136 converts the reference clock signal into the receive clock signal 138 (i.e., recovered clock), and outputs the receive clock signal 138 to the data receiver 132 for data recovery, the same as before.

In contrast to the clock scheme in FIG. 1, the clock scheme in FIG. 2 does not require an external chip for the clock generator 150. However, the clock PLL 210 may consume a large amount of power and take up a large chip area in order to meet tight timing requirements (e.g., stability, low jitter, etc.) specified by the PCIe standard.

Figure 3:
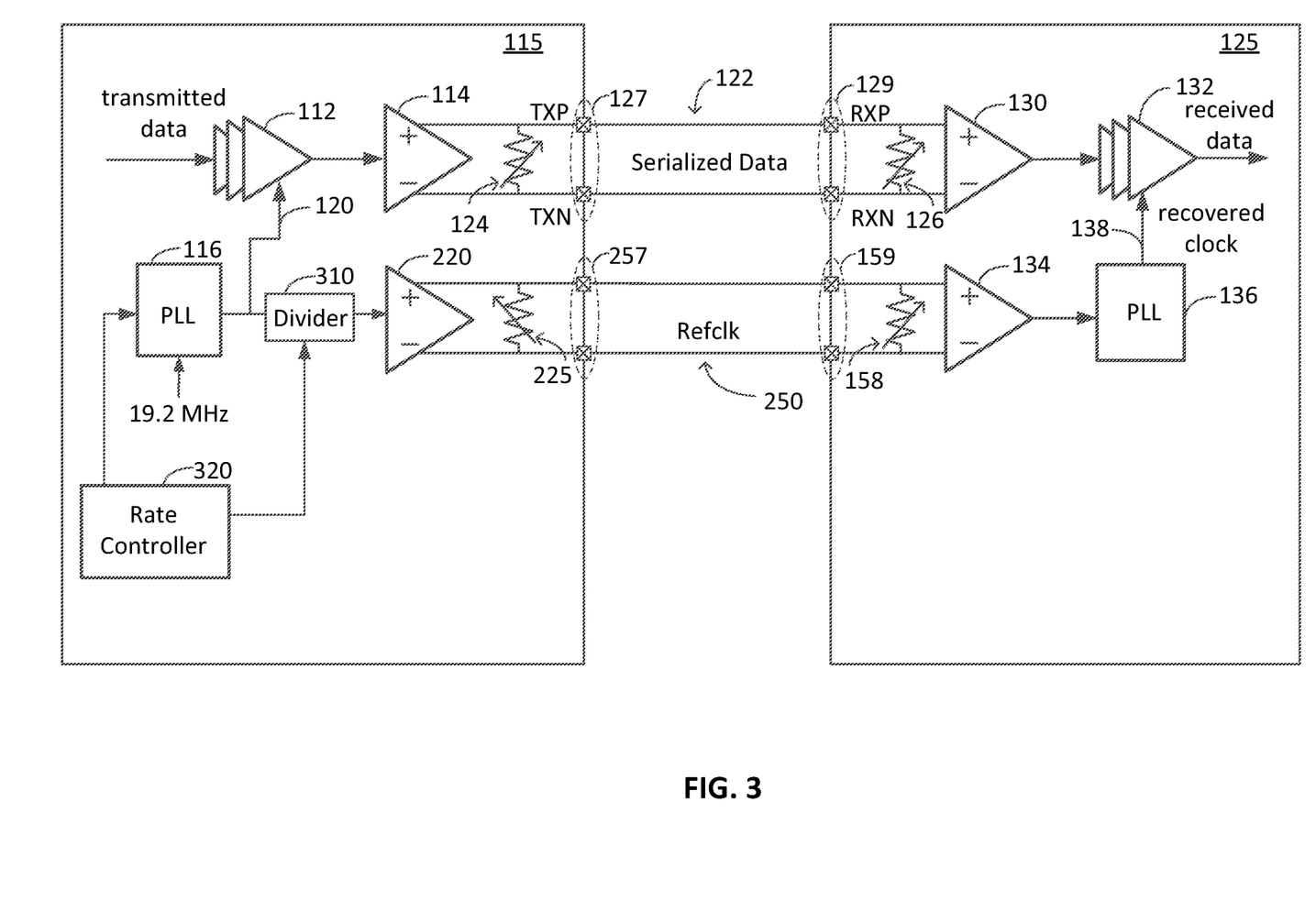
FIG. 3 shows an exemplary clock forwarding scheme according to certain aspects of the present disclosure.

FIG. 3 shows an exemplary clock forwarding scheme according to aspects of the present disclosure. Components that are common to the clock scheme in FIG. 2 and the clock scheme in FIG. 3 are identified by the same reference numbers. Instead of using the clock PLL 210 in FIG. 2 to generate the reference clock signal, the clock scheme in FIG. 3 reuses the PLL 116 to generate the reference clock signal, as discussed further below. This removes the need for the clock PLL 210, which reduces power and improves area efficiency.

In this example, the PLL 116 receives the input clock signal and converts the input clock signal into the transmit clock signal by multiplying the frequency of the input clock signal by a frequency multiplier. More particularly, the PLL 116 multiples the frequency of the input clock signal up to the transmit frequency. As discussed above, the input clock signal may have a frequency of 19.2 MHz and the transmit frequency may be in the GHz frequency range for high-speed data communication. Also, as discussed above, the input clock signal may come from a crystal oscillator or another stable clock source. The PLL 116 outputs the transmit clock signal 120 to the data transmitter 112, the same as before. As discussed above, the data transmitter 112 may be a serializer that converts data into a serial data signal synchronized with the transmit clock signal. The data transmitter 112 outputs the serial data signal to the link driver 114, which transmits the serial data signal to the link receiver 130 on the second chip 125 via the differential serial link 122.

In this example, the first chip 115 also includes a frequency divider 310 to generate the reference clock signal from the transmit clock signal 120, as discussed further below. The frequency divider 310 receives the transmit clock signal 120, and converts the transmit clock signal 120 into the reference clock signal by dividing the frequency of the transmit clock signal 120 down to the reference frequency (e.g., 100 MHz). The frequency divider 310 outputs the generated reference clock signal to the clock driver 220 on the first chip 115. The clock driver 220 transmits (e.g., forwards) the reference clock signal to the clock receiver 134 on the second chip 125 via the differential clock link 250, the same as before.

In certain aspects, the first and second chips 115 and 125 support multiple data rates for the serial data signal. For the example of the PCIe standard, the first and second chips 115 and 125 may support a data rate of 5 Gbps for Generation 1, 8 Gbps for Generation 3, 16 Gbps for Generation 4, etc. In this example, the first and second chips 115 and 125 may switch between the different data rates by changing the frequency of the transmit clock signal 120 output by the PLL 116 and changing the frequency of the receive clock signal 138 output by the PLL 136 accordingly. For example, the PLLs 116 and 136 may run at a frequency of 5 GHz for Generation 2, a frequency of 8 GHz for Generation 3, a frequency of 16 GHz for Generation 4, etc.

In this example, the frequency of the PLL 116 may be changed by changing the frequency multiplier of the PLL 116. As discussed above, the PLL 116 generates the transmit clock signal 120 by multiplying the frequency of the input clock signal (e.g., 19.2 MHz) up to the frequency of the transmit frequency. Thus, the output frequency of the PLL 116 (i.e., the transmit frequency) can be changed by changing the frequency multiplier of the PLL 116. The frequency multiplier of the PLL 116 may be changed by changing the divider value of a frequency divider in a PLL loop in the PLL 116, as is known in the art.

In certain aspects, the first chip 115 may include a rate controller 320 configured to switch the data rate of the serial data signal. The rate controller 320 may switch (i.e., change) the data rate by changing the frequency of the transmit clock signal 120. As discussed above, the frequency of the transmit clock signal 120 may be changed by changing the frequency multiplier of the PLL 116. When the frequency multiplier is changed, the PLL 116 needs time to relock to a new frequency. During relocking of the PLL 116, the transmit clock signal 120 may temporarily stop and/or drift in frequency.

A problem is that relocking of the PLL 116 also causes the reference clock signal to temporarily stop and/or drift in frequency. This is because the reference clock signal is generated by dividing down the frequency of the transmit clock signal 120. As a result, when the transmit clock signal 120 temporarily stops and/or drifts in frequency during relocking of the PLL 116, the reference clock signal also temporarily stops and/or drifts in frequency. This is a problem because the PCIe standard requires the reference clock signal to continuously run during a data rate switch (i.e., change). In other words, the first chip 115 needs to maintain transmission of the reference clock signal (e.g., at a constant frequency of 100 MHz) to the second chip 125 during the data rate switch.

To address this, some aspects of the present disclosure provide a clock forwarding scheme in which the reference clock signal forwarded to the second chip 125 is temporarily switched from the reference clock signal provided by the frequency divider 310 to a secondary reference clock signal during a data switch (i.e., change) to avoid disruption in the reference clock signal forwarded to the second chip 125. In certain aspects, the secondary reference clock signal is dirty compared with the reference clock signal provided by the frequency divider 310 (i.e., the secondary reference clock signal does not meet the stringent timing requirements specified by the PCIe standard). This allows the secondary reference clock signal to be generated by a clock generator that consumes less power and takes up less area than the clock PLL 210 discussed above (which needs to meet the stringent timing requirements specified by the PCIe standard). The secondary reference clock signal does not need to meet the stringent timing requirements specified by the PCIe standard because the secondary reference clock signal is used during a data rate switch and not during data transmission, as discussed further below. Thus, the clock forwarding scheme according to aspects of the present disclosure is able to reduce power and area compared with the clock forwarding scheme in FIG. 2 while maintaining a reference clock signal to the second chip 125 during a data rate switch (i.e., change).

Figure 4:
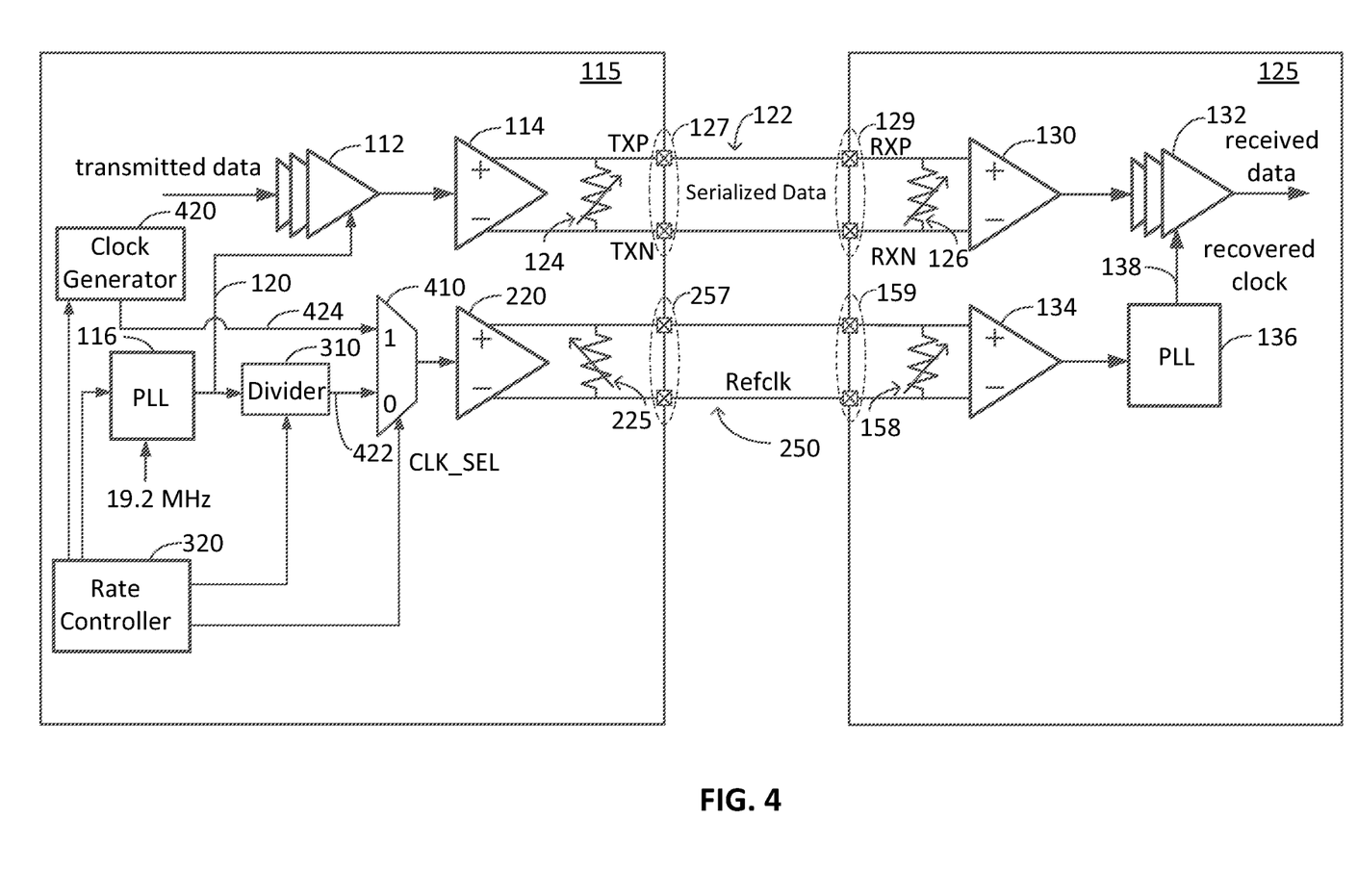
FIG. 4 shows another exemplary clock forwarding scheme according to certain aspects of the present disclosure.

FIG. 4 shows an exemplary clock forwarding scheme according to some aspects of the present disclosure. Components that are common to the clock scheme in FIG. 3 and the clock scheme in FIG. 4 are identified by the same reference numbers. In this example, the first chip 115 includes a clock generator 420 configured to generate the secondary reference clock signal 424. As discussed above, the secondary reference clock signal 424 may be dirty compared with the reference clock signal provided by the frequency divider 310 (i.e., the secondary reference clock signal does not meet the stringent timing requirements specified by the PCIe standard). The less stringent timing requirements for the secondary reference clock signal 424 allows the clock generator 420 to be implemented with a clock generator that consumes less power and takes up less area than the clock PLL 210 discussed above. For example, the clock generator 420 may be implemented with a ring oscillator, a PLL with more relaxed timing than the clock PLL 210, or another type of clock generator.

In this example, the first chip 115 also includes a multiplexer 410 having a first input (labeled "0"), a second input (labeled "1"), a select input, and an output. The first input of the multiplexer 410 is coupled to the frequency divider 310 and receives the reference clock signal 422 from the frequency divider 310. In the discussion below, the reference clock signal 422 from the frequency divider 310 is referred to as the primary reference clock signal. The second input of the multiplexer 410 is coupled to the clock generator 420 and receives the secondary reference clock signal 424 from the clock generator 420. The output of the multiplexer 410 is coupled to the input of the clock driver 220.

The multiplexer 410 receives a select signal (labeled "CLK_SEL") at the select input, selects one of the primary and secondary reference clock signals 422 and 424 based on the logic value of the select signal, and outputs the selected one of the primary and secondary reference clock signals 422 and 424 at the output of the multiplexer 410. The multiplexer 410 outputs the selected one of the primary and secondary reference clock signals 422 and 424 to the clock driver 220, which transmits the selected one of the primary and secondary reference clock signals 422 and 424 to the clock receiver 134 on the second chip 125 via the clock link 250. The clock driver 220 transmits the selected one of the primary and secondary reference clock signals 422 and 424 by driving the clock link 250 with the selected one of the primary and secondary reference clock signals 422 and 424.

In one example, the multiplexer 410 selects the first input (labeled "0") when the select signal is logic zero, and selects the second input (labeled "1") when the select signal is logic one. In this example, the multiplexer 410 selects the primary reference clock signal 422 if the select signal is zero. In this case, the multiplexer 410 provides the primary reference clock signal 422 to the clock driver 220. The multiplexer 410 selects the secondary reference clock signal 424 if the select signal is one. In this case, the multiplexer 410 provides the secondary reference clock signal 424 to the clock driver 220. In certain aspects, the rate controller 320 controls which one of the reference clock signals 422 and 424 is selected by the multiplexer 410 using the select signal, as discussed further below. It is to be appreciated that the multiplexer 410 is not limited to the example given above. In general, the multiplexer 410 selects the primary reference clock signal 422 if the select signal has a first logic value, and selects the secondary reference clock signal 424 if the select signal has a second logic value.

Figure 5:
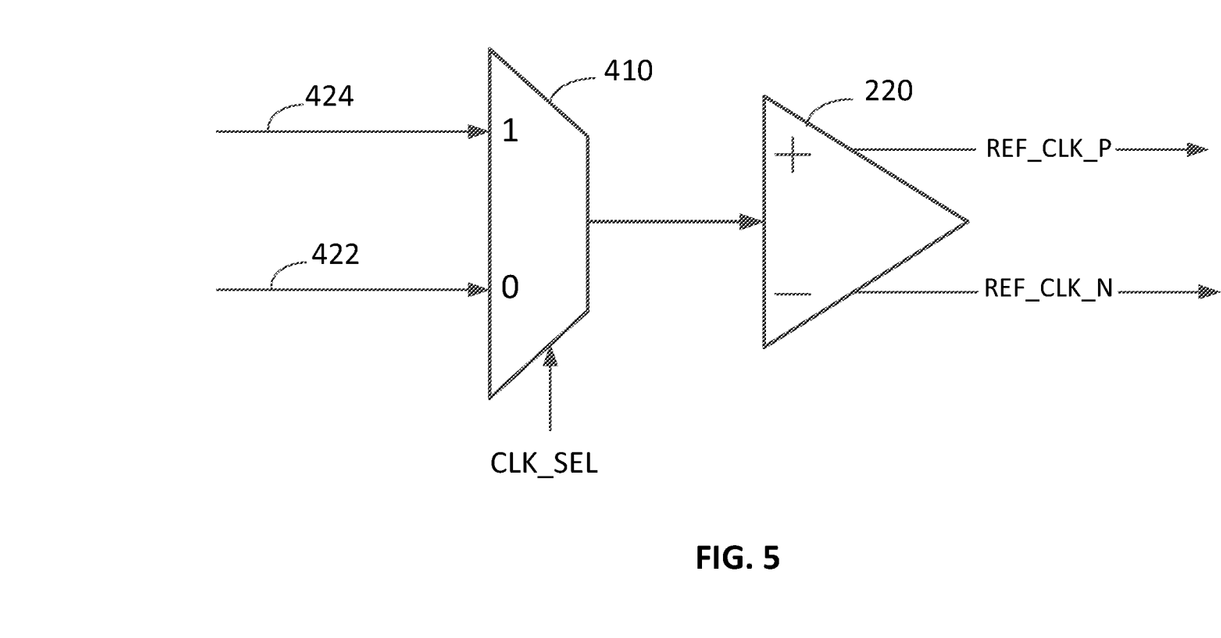
FIG. 5 shows an example of a multiplexer configured to switch between two reference clock signals according to certain aspects of the present disclosure.

FIG. 5 shows a close-up view of the multiplexer 410 and the clock driver 220 according to certain aspects. In this example, the primary reference clock signal 422 and the secondary reference clock signal 424 have approximately the same frequency (e.g., 100 MHz). The multiplexer 410 selects one of the reference clock signals 422 and 424 based on the select signal (labeled "CLK_SEL") and outputs the selected one of the reference clock signals to the input of the clock driver 220. The clock driver 220 transmits (i.e., forwards) the selected reference clock signal to the clock receiver 134 on the second chip 125 via the differential clock link 250. For example, the clock driver 220 may transmit the selected reference clock signal by driving the clock link 250 with the selected reference clock signal. Note that the clock driver 220 transmits the selected reference clock signal as a differential clock signal including a pair of complementary signals (labeled "REF_CLK_P" and "REF_CLK_N"). The clock link 250 may include two wires, two metal traces on a circuit board, or any combination thereof.

During data transmission (i.e., transmit activity), the rate controller 320 instructs the multiplexer 410 to select the primary reference clock signal 422 (e.g., by outputting a select signal of zero to the select input of the multiplexer 410). The rate controller 320 may switch the data rate from a first data rate to a second data rate as follows. Before the data rate change, the PLL 116 outputs the transmit clock signal 120 at a transmit frequency corresponding to the first data rate. Also, the frequency divider 310 frequency divides the transmit clock signal 120 to generate the primary reference clock signal 422. Further, the multiplexer 410 selects the primary reference clock signal 422 (i.e., the clock driver 220 transmits the primary reference clock signal 422 to the second chip 125).

To perform the data rate switch (i.e., change), the rate controller 320 stops data transmission (i.e., transmit activity) at the first data rate. The rate controller 320 then instructs the multiplexer 410 to select the secondary reference clock signal 424 (e.g., by switching the select signal from zero to one). At this point, the multiplexer 410 outputs the secondary reference clock signal 424 to the clock driver 220, which transmits (i.e., forwards) the secondary reference clock signal 424 to the clock receiver 134 on the second chip 125.

The rate controller 320 then changes the frequency multiplier of the PLL 116 to change the frequency of the transmit clock signal 120 to a new transmit frequency corresponding to the second data rate. The rate controller 320 changes the frequency multiplier while the secondary reference clock signal 424 is selected by the multiplexer 410. When the frequency multiplier is changed, the PLL 116 needs time to relock to the new transmit frequency. During relocking of the PLL 116, the transmit clock signal 120 may temporarily stop and/or drift in frequency. The frequency of the PLL 136 on the second chip 125 may be changed in a similar manner.

The rate controller 320 also changes the divider value of the frequency divider 310 to keep the frequency (e.g., 100 MHz) of the primary reference clock signal 422 the same before and after the data rate change. For example, if the frequency of the transmit clock signal 120 is doubled for the second data rate, then the rate controller 320 may double the divider value of the frequency divider 310 to keep the frequency of the primary reference clock signal 422 approximately the same before and after the data rate change.

After the PLL 116 relocks to the frequency for the second data rate, the rate controller 320 may instructs the multiplexer 410 to switch back to the primary reference clock signal 422 (e.g., by switching the select signal from one back to zero). At this point, the multiplexer 410 outputs the primary reference clock signal 422 to the clock driver 220, which transmits (i.e., forwards) the primary reference clock signal 422 to the clock receiver 134 on the second chip 125.

After the switch back to the primary reference clock signal 422, the rate controller 320 may resume data transmission (i.e., transmit activity) at the second data rate.

Thus, during relocking of the PLL 116, the clock driver 220 transmits (i.e., forwards) the secondary reference clock signal 424 to the second chip 125. As a result, disruptions in the primary reference clock signal 422 caused by switching the frequency of the PLL 116 do not affect the reference clock signal forwarded to the clock receiver 134 on the second chip 125. By temporarily switching the clock driver 220 to the secondary reference clock signal during the data rate switch, the clock driver 220 is able to provide a continuously running reference clock signal to the second chip 125 during the data rate switch.

Figure 6:
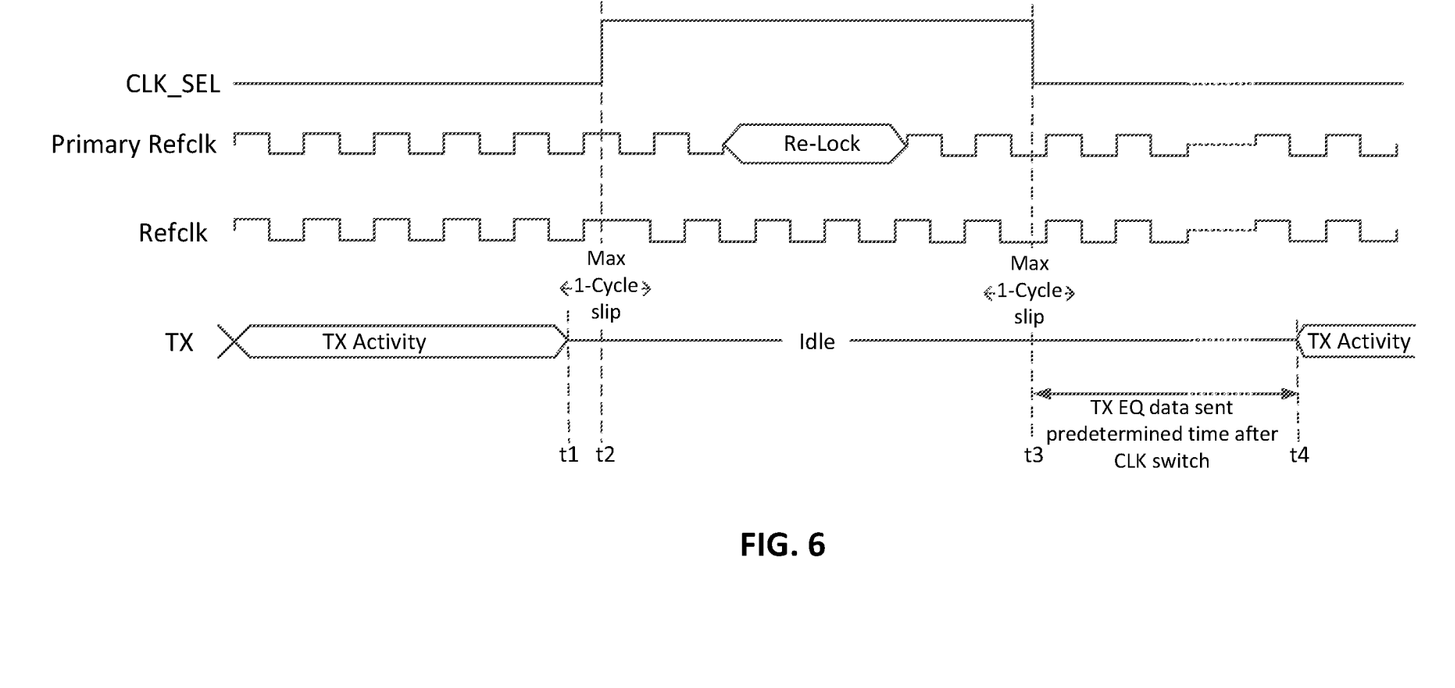
FIG. 6 is a timing diagram showing different signals during a data rate change according to certain aspects of the present disclosure.

FIG. 6 shows an exemplary timing diagram illustrating a data rate switch (i.e., change) according to aspects of the present disclosure. The exemplary timing diagram includes the select signal (labeled "CLK_SEL"), the primary reference clock signal 422 (labeled "Primary Refclk"), and the reference clock signal at the output of the multiplexer 410 (labeled "Refclk"). The reference clock signal at the output of the multiplexer 410 is input to the clock driver 220, which transmits the reference clock signal to the second chip 125. In this example, the rate controller 320 switches the data rate from a first data rate to a second data rate.

At the start of the timing diagram, the first chip 115 transmits data to the second chip 125 at the first data rate. During this time, the select signal is zero and the multiplexer 410 outputs the primary reference clock signal 422.

At time t1, the rate controller 320 stops data transmission (i.e., transmit activity) at the first data rate. At time t2, the rate controller 320 switches the select signal from zero to one, causing the multiplexer 410 to switch from the primary reference clock signal 422 to the secondary reference clock signal 424. After the clock switch, the rate controller 320 changes the frequency multiplier of the PLL 116 to change the frequency of the PLL 116 to a new frequency corresponding to the second data rate. The PLL 116 relocks to the new frequency during a relock period (labeled "Re-Lock").

After the PLL 116 relocks to the new frequency, the rate controller 320 switches the select signal from one to zero at time t3, causing the multiplexer 410 to switch back to the primary reference clock signal 422. Thus, in this example, the reference clock signal forwarded to the second chip 125 (labeled "Refclk") is provided by the primary reference clock signal 422 before time t1 and after time t3, and is provided by the secondary reference clock signal 424 between time t2 and time t3. The PLL 116 relocks to the new frequency between time t2 and t3. Thus, during the relock period, the clock driver 220 transmits (i.e., forwards) the secondary reference clock signal 424 to the second chip 125. Therefore, disruptions in the primary reference clock signal 422 during the relock period do not affect the reference clock signal forwarded to the clock receiver 134 on the second chip 125.

After the clock switch back to the primary reference clock signal 422 at time t3, the rate controller 320 resumes data transmission at the second data rate at time t4. The rate controller 320 may wait for a predetermined time period after time t3 before resuming data transmission at the second data rate.

Between time t2 and time t3, the rate controller 320 may also change the divider value of the frequency divider 310 to keep the frequency of the primary reference clock signal 422 before t2 and after time t3 approximately the same (e.g., 100 MHz).

In certain aspects, the rate controller 320 may control power to the clock generator 420. In these aspects, the rate controller 320 may turn off the clock generator 420 when the secondary clock signal 424 is not needed to conserve power. For example, the rate controller 320 may turn on the clock generator 420 to generate the secondary reference clock signal 424 before a data rate switch (e.g., before time t2 in FIG. 6). After the data rate switch (e.g., after time t3 in FIG. 6), the rate controller 320 may turn the clock generator 420 off to conserve power. In contrast, the clock PLL 210 in FIG. 2 needs to remain continuously on to provide the reference clock signal during data transmissions. In certain aspects, the clock generator 420 may be used to generate a clock signal for another purpose when the secondary reference clock signal 424 is not needed. In other words, the clock generator 420 may be reused for another purpose when the secondary reference clock signal 424 is not needed.

Figure 7:
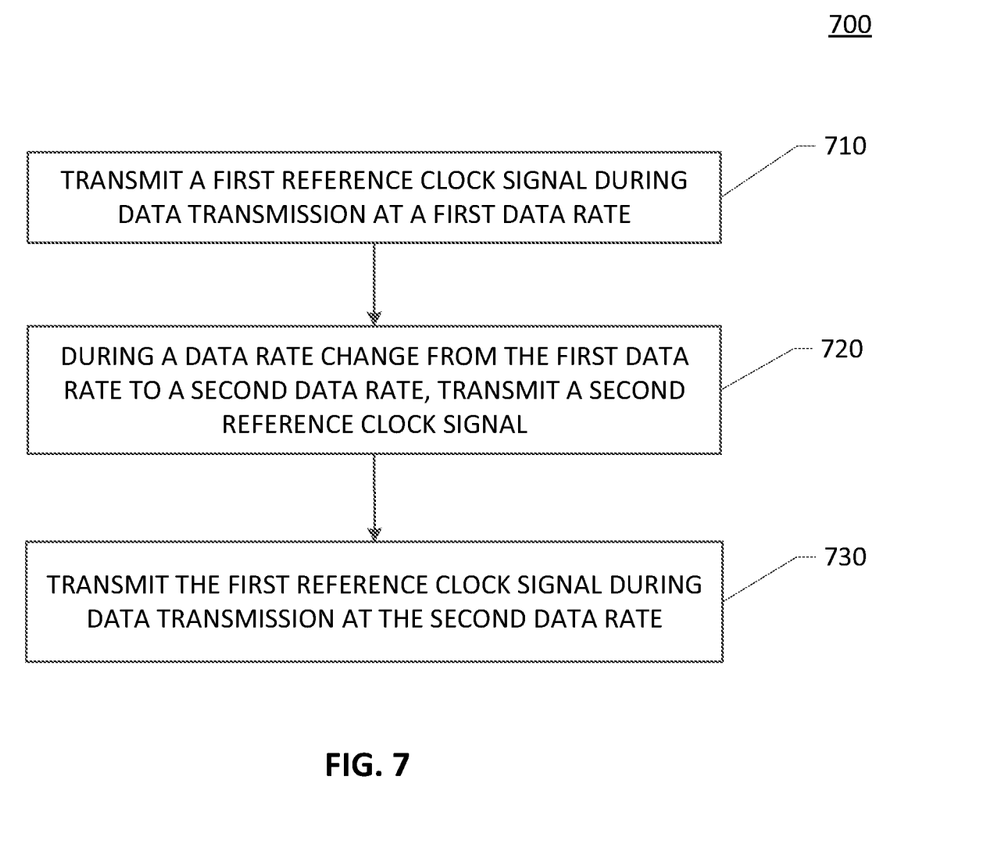
FIG. 7 is a flowchart illustrating a method for clock forwarding according to certain aspects of the present disclosure.

FIG. 7 is a flowchart illustrating a method 700 for clock forwarding according to certain aspects of the present disclosure. The method 700 may be performed at the first chip 115.

At block 710, a first reference clock signal is transmitted during data transmission at a first data rate. For example, the first reference clock signal (e.g., the primary reference clock signal 422) may be generated by dividing down the frequency of the output clock signal (e.g., transmit clock signal 120) of the PLL 116. The first reference clock signal may be transmitted (i.e., forwarded) from the first chip 115 to the second chip 125 (e.g., by driving the clock link 250 with the first reference clock signal).

At block 720, during a data rate change from the first data rate to a second data rate, a second reference clock signal is transmitted. The data rate change may be performed by changing the frequency of the output clock signal of the PLL 116 (e.g., by changing the frequency multiplier of the PLL 116). The second reference clock signal (e.g., the secondary reference clock signal 424) may be generated by a clock generator (e.g., clock generator 420) that is separate (i.e., independent) of the PLL 116 so that the second reference clock signal is unaffected by a relocking of the PLL 116. The second reference clock signal may be transmitted (i.e., forwarded) from the first chip 115 to the second chip 125 (e.g., by driving the clock link 250 with the second reference clock signal).

At block 730, the first reference clock signal is transmitted during data transmission at the second data rate.

It is to be appreciated that the present disclosure is not limited to the exemplary terms used above to describe aspects of the present disclosure. For example, it is to be appreciated that the primary reference clock signal 422 may also be referred to as the first reference clock signal or another term, and the secondary reference clock signal 424 may also be referred to as the second reference clock signal or another term. In another example, a driver may also be referred to as an amplifier, a transmitter, a transmit (TX) driver, or another term. In still another example, a chip may also be referred to as a die. The data receiver 132 may also be referred to as a data recovery circuit or another term. The transmit clock signal 120 may also be referred to as an output clock signal of the PLL 116.

Although aspects of the present disclosure are discussed above using the example of the PCIe standard, it is to be appreciated that present disclosure is not limited to this example, and may be used with other standards. Also, it is to be appreciated that the reference clock signal transmitted to the second chip 125 is not limited to the exemplary clock frequency of 100 MHz discussed above, and may have a different clock frequency.

It is to be appreciated that an I/O pad does not require that the I/O pad be used as both an input and an output. For example, an I/O pad may be used only as an output or only as an input depending on the use case of the I/O pad. In the above examples, a pair of I/O pads is used to couple each driver or receiver to a link. However, it is to be appreciated that the present disclosure is not limited to these examples. For example, for a single-ended (i.e., non-differential) driver or receiver, a single I/O pad may be used to couple the driver or receiver to a link Thus, generally speaking, the output of a driver may be coupled to one or more I/O pads and the input of a receiver may be coupled to one or more I/O pads.

The rate controller 320 discussed above may be implemented with a general-purpose processor, a digital signal processor (DSP), an application specific integrated circuit (ASIC), a field programmable gate array (FPGA) or other programmable logic device, discrete hardware components (e.g., logic gates), or any combination thereof designed to perform the functions described herein. A processor may perform the functions described herein by executing software comprising code for performing the functions. The software may be stored on a computer-readable storage medium, such as a RAM, a ROM, an EEPROM, an optical disk, and/or a magnetic disk.

Any reference to an element herein using a designation such as "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect electrical coupling between two structures. Also, the term "approximately" means within ten percent of the stated value.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus, comprising:
   a multiplexer having a first input, a second input, a select input, and an output, wherein the first input is configured to receive a first reference clock signal, the second input is configured to receive a second reference clock signal, the select input is configured to receive a select signal, and the multiplexer is configured to:
     select one of the first and second reference clock signals based on the select signal; and
     output the selected one of the first and second reference clock signals at the output of the multiplexer;
   a clock driver having an input and an output, wherein the input of the clock driver is coupled to the output of the multiplexer;
   a phase locked loop (PLL) configured to convert an input clock signal into an output clock signal, wherein the PLL is configured to convert the input clock signal into the output clock signal by multiplying a frequency of the input clock signal by a frequency multiplier;
   a frequency divider configured to convert the output clock signal into the first reference clock signal; and
   a controller configured to
     instruct the multiplexer to select the second reference clock signal using the select signal;
     change the frequency multiplier of the PLL while the second reference clock signal is selected by the multiplexer; and
     after the frequency multiplier of the PLL is changed, instruct the multiplexer to select the first reference clock signal using the select signal.

2. The apparatus of claim 1, further comprising one or more input/output pads coupled to the output of the clock driver.

3. The apparatus of claim 1, wherein the frequency divider is configured to convert the output clock signal into the first reference clock signal by dividing a frequency of the output clock signal down to a reference frequency.

4. The apparatus of claim 3, wherein the reference frequency is approximately equal to 100 MHz.

5. The apparatus of claim 1, further comprising a data transmitter configured to:
   receive data and the output clock signal; and
   convert the data into a serial data signal synchronized with the output clock signal.

6. The apparatus of claim 5, further comprising a link driver having an input and an output, wherein the input of the link driver is configured to receive the serial data signal.

7. The apparatus of claim 6, further comprising one or more first input/output (I/O) pads coupled to the output of the link driver.

8. The apparatus of claim 7, further comprising one or more second I/O pads coupled to the output of the clock driver.

9. The apparatus of claim 6, wherein:
   the output of the link driver is coupled to a first link between a first chip and a second chip, wherein the link driver is configured to drive the first link with the serial data signal; and
   the output of the clock driver is coupled to a second link between the first chip and the second chip, wherein the clock driver is configured to drive the second link with the selected one of the first and second reference clock signals.

10. The apparatus of claim 1, wherein the frequency divider is configured to convert the output clock signal into the first reference clock signal by dividing a frequency of the output clock signal down to a reference frequency.

11. The apparatus of claim 1, further comprising a clock generator configured to generate the second reference clock signal.

12. The apparatus of claim 11, wherein the first reference clock signal and the second reference clock signal have approximately a same frequency.

13. The apparatus of claim 1, wherein the multiplexer is configured to:
select the first reference clock signal if the select signal has a first logic value; and
select the second reference clock signal if the select signal has a second logic value.

14. The apparatus of claim 1, wherein the output of the clock driver is coupled to a link between a first chip and a second chip, and the clock driver is configured to drive the link with the selected one of the first and second reference clock signals.

15. A method for clock forwarding, comprising:
transmitting a first reference clock signal during data transmission at a first data rate;
during a data rate change from the first data rate to a second data rate, transmitting a second reference clock signal; and
transmitting the first reference clock signal during data transmission at the second data rate, wherein the first reference clock signal and the second reference clock signal have approximately a same frequency.

16. The method of claim 15, wherein:
transmitting the first reference clock signal comprises driving a link between a first chip and a second chip with the first reference clock signal; and
transmitting the second reference clock signal comprises driving the link with the second reference clock signal.

17. A method for clock forwarding, comprising:
transmitting a first reference clock signal during data transmission at a first data rate;
during a data rate change from the first data rate to a second data rate, transmitting a second reference clock signal;
transmitting the first reference clock signal during data transmission at the second data rate; and
generating the first reference clock signal, wherein generating the first reference clock signal comprises:
converting an input clock signal into an output clock signal using a phase locked loop (PLL); and
dividing a frequency of the output clock signal to generate the first reference clock signal.

18. The method of claim 17, further comprising:
generating a data signal for the data transmission at the first data rate using the output clock signal; and
changing the data rate from the first data rate to the second data rate by changing a frequency of the output clock signal.

19. The method of claim 18, wherein changing the frequency of the output clock signal comprises changing a frequency multiplier of the PLL.

20. The method of claim 18, wherein transmitting the second reference clock signal comprises transmitting the second reference clock signal during a relock period of the PLL associated with the change in the frequency of the output clock signal.

21. The method of claim 18, further comprising generating the second reference clock signal using a clock generator that is independent of the PLL.

22. The method of claim 18, wherein the data signal comprises a serial data signal synchronized with the output clock signal.

* * * * *